United States Patent
You

(10) Patent No.: US 8,096,623 B2
(45) Date of Patent: Jan. 17, 2012

(54) PROTECTION STRUCTURE FOR OUTER SHELL OF A HUB

(75) Inventor: Gwo-Dong You, Taichung (TW)

(73) Assignee: Xero Engineering Inc., Taichung (TW)

( * ) Notice: Subject to any disclaimer, the term of this patent is extended or adjusted under 35 U.S.C. 154(b) by 602 days.

(21) Appl. No.: 12/266,094

(22) Filed: Nov. 6, 2008

(65) Prior Publication Data

US 2009/0066152 A1 Mar. 12, 2009

(30) Foreign Application Priority Data

Nov. 9, 2007 (TW) ............................... 96218930 U

(51) Int. Cl.
*B60B 19/00* (2006.01)

(52) U.S. Cl. .................... 301/6.1; 301/110.5; 192/64

(58) Field of Classification Search .............. 301/6.1, 301/6.5, 6.9, 110.5–110.6; 192/64, 217.4–217.5; 474/116, 160; 403/359.1–359.2, 359.5–359.6; 74/496, 498
See application file for complete search history.

(56) References Cited

U.S. PATENT DOCUMENTS

| 72,409 | A | * | 12/1867 | Mason | 403/359.1 |
| 2,066,395 | A | * | 1/1937 | Eksergian | 188/218 R |
| 4,359,294 | A | * | 11/1982 | Crillesen | 403/359.1 |
| 6,620,050 | B2 | * | 9/2003 | Park | 464/162 |
| 7,351,171 | B2 | * | 4/2008 | Kanehisa et al. | 474/160 |
| 2001/0002966 | A1 | * | 6/2001 | Aota et al. | 403/359.5 |
| 2008/0315679 | A1 | * | 12/2008 | Shook | 301/110.5 |
| 2010/0254752 | A1 | * | 10/2010 | Shook | 403/179 |

* cited by examiner

Primary Examiner — Jason Bellinger

(57) ABSTRACT

A protection structure for outer shell of a hub comprises: a hub and an outer shell mounted at one end of the hub, the outer shell is provided at one end close to the hub with an enlarged flange, on an outer peripheral surface of the outer shell are annularly and spaced-apart formed a plurality of splines and at least one positioning rib, at least at one side of each splines is disposed with a protecting member whose material is different from that of the outer shell. By such arrangements, the protecting member can be assembled with a sprocket to prevent the sprocket from touching the splines. Thus, damages of the outer shell of the hub are prevented.

6 Claims, 4 Drawing Sheets

PROTECTION STRUCTURE FOR OUTER SHELL OF A HUB

BACKGROUND OF THE INVENTION

1. Field of the Invention

The present invention relates to a hub for bicycle, and more particularly to a protection structure for outer shell of a hub.

2. Description of the Prior Art

The conventional bicycle hubs for connecting the spokes and wheel are provided at one end with an outer shell thereof. A sprocket can be mounted onto the end of the hub. Most of the outer shells sold on the market are made of aluminum alloy in order to reduce the weight of the outer shell. However, aluminum alloy is a kind of soft metal while the sprocket is made of hard metal steel for the sake of structural rigidity.

To make it easy and quick for the splines made of aluminum alloy to be engaged with the receiving hole of the sprocket made of steel, it requires a tolerance when assembling the outer shell with the sprocket. However, the tolerance will cause a few impacts of hitting to the sprocket and the outer shell of the hub when the sprocket drives the hub to rotate. As what is mentioned, the sprocket is made of hard metal while the outer shell of the hub is made of soft metal. After the sprocket drove and collided with the outer shell for a long time, the splines on the outer peripheral surface of the outer shell would be damaged and worn down easily, reducing the engagement tightness of the splines.

A solution to the above problem is to replace the outer shell of the hub. However, replacing the outer shell will cause other problems. For example, the high price of the raw material such as aluminum is increasing rapidly, resulting in a problem of high cost. Therefore, the first impact of replacing the damaged aluminum outer shell is the increased cost.

On the other hand, there are two methods to assemble the sprocket and the outer shell of the hub. The first method is to screw the outer shell to the hub, as mentioned above, so that the outer shell can be replaced separately. The second method is that the outer shell is integrally formed on the hub, leading to a result that the outer shell must be replaced together with the hub. Thus, the second method costs more expanses on the raw material than the first method indirectly.

Therefore, the present invention has arisen to mitigate and/or obviate the afore-described disadvantages.

SUMMARY OF THE INVENTION

The primary object of the present invention is to provide a replaceable outer shell of a hub which is capable of preventing the damage of the splines of the outer shell of the hub.

The secondary object of the present invention is to provide an outer shell of a hub which reduces the amount of material used so as to reach an economic goal.

To achieve the above object, a protection structure for outer shell of a hub in accordance with present invention comprises: a hub and an outer shell mounted at one end of the hub, wherein the outer shell has one end close to the hub. An enlarged flange 22 is formed at the end that the outer shell is close to the hub. On an outer peripheral surface of the outer shell are annularly and spaced-apart formed with a plurality of splines and at least one positioning rib. At least one side of each splines is disposed with a protecting member whose material is different from a material of the outer shell. By such arrangements, the protecting member can be assembled with the sprocket to prevent the sprocket from contacting the splines. Thus, a goal of preventing the damage of the outer shell of the hub is reached.

In addition, the abutting members made of steel are disposed and cooperating with the splines of the outer shell made of aluminum to form a width which equals a width of containing holes of the sprocket. In general, the amount of aluminum material used for the splines of the outer shell of the hub is only two-third or half of the amount of aluminum material used for the conventional structure. Additionally, the protection structure made of steel not only protects the outer shell of the hub but also saves the aluminum consumption.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

The present invention will be clearer from the following description when referring to the accompanying drawings, which show, for purpose of illustrations only, the preferred embodiment in accordance with the present invention.

Figure 1:
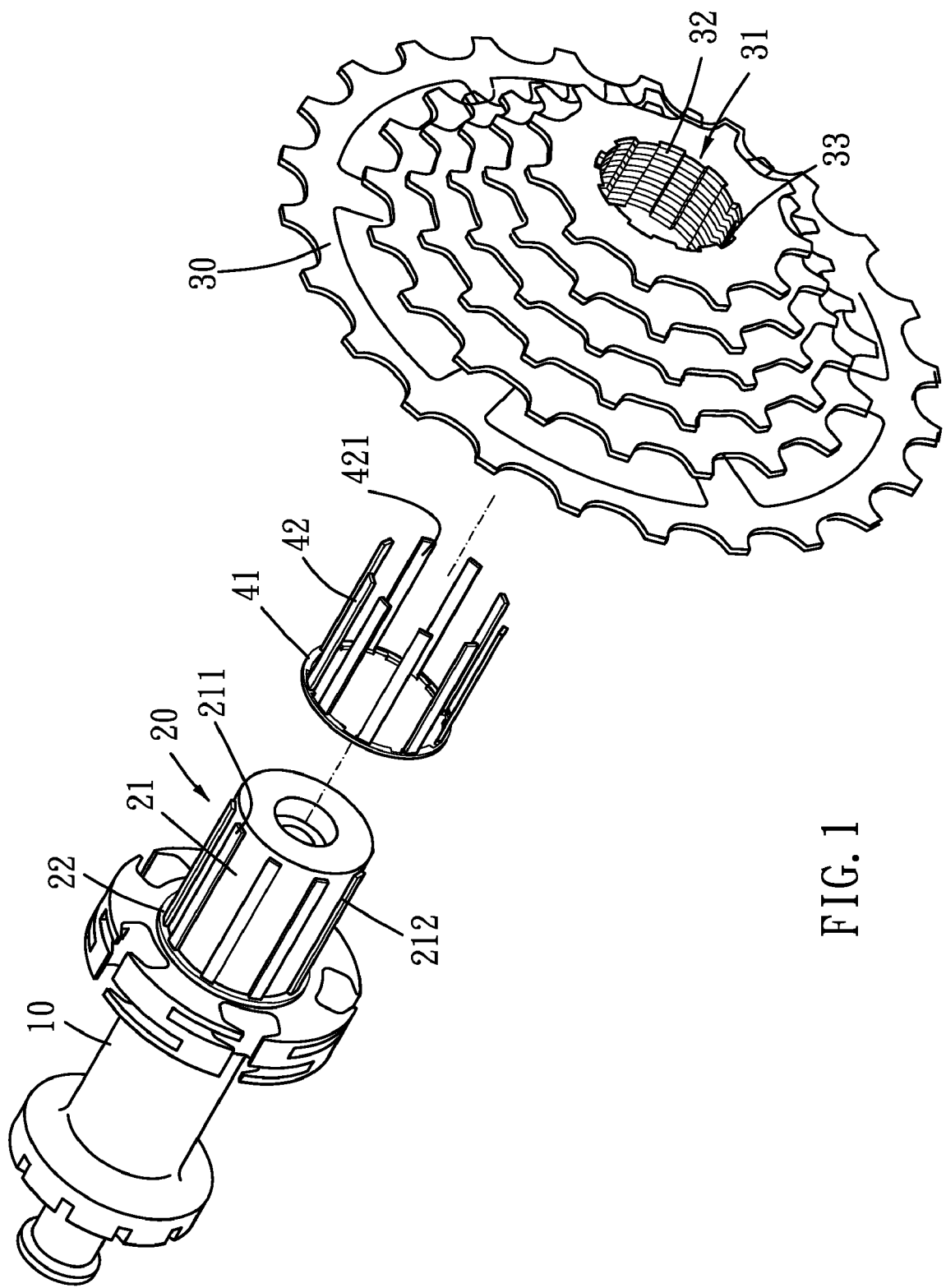
FIG. 1 is a decomposition drawing of a protection structure in accordance with a first embodiment of the present invention.
Figure 2:
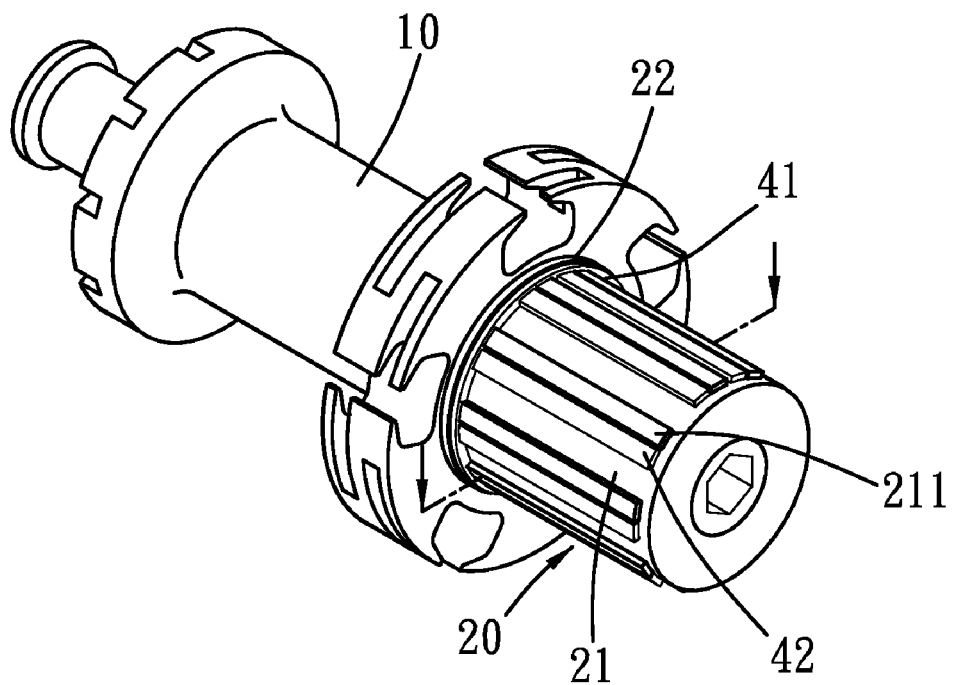
FIG. 2 is an a schematic drawing of the protection structure for outer shell of a hub in accordance with the first embodiment of the present invention.
Figure 3:
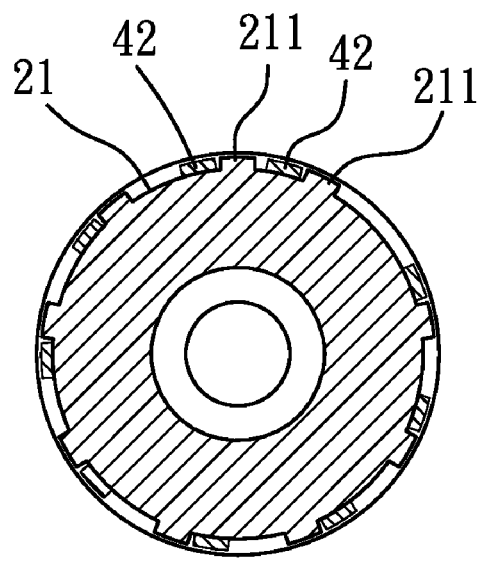
FIG. 3 is a cross-sectional drawing of the protection structure for outer shell of a hub in accordance with the first embodiment of the present invention.

Referring to FIGS. 1-3, a protection structure for an outer shell in accordance with a preferred embodiment of the present invention comprises: a hub 10, an outer shell 20, and a sprocket 30 mounted on the shell 20. The structure of the hub 10 is conventional, so further explanation is omitted.

A main improvement of the present invention focuses on the outer shell 20 of the hub, as shown in FIGS. 1-3.

The cylindrical outer shell 20 is made of lightweight aluminum (such as aluminum alloy). Also, the outer shell 20 can be made of composite materials more advanced and lightweight (such as carbon fiber). In this embodiment, the outer shell 20 of the hub is made of aluminum alloy and comprises an outer peripheral surface 21. The outer peripheral surface 21 has one end where is close to the hub. An enlarged flange 22 is formed at the end of the outer peripheral surface 21 where is close to the hub. Plural splines 211 and at least one positioning rib 212 are equidistantly and annually arranged on the outer peripheral surface 21, and a width of the positioning rib 212 is smaller than a width of the splines 211. The positioning rib 212 and the splines 211 are close to a free end of the outer shell 20, and the positioning rib 212 and the splines 211 extend toward the hub to connect the flange 22. Besides, the width of the splines 211 is smaller than the international standard size. For example, the width of the splines 211 is two-third or half size smaller in comparison with the international standard size.

The steel sprocket 30 has an axial hole 31. An inner surface of the steel sprocket 30 has containing holes 32 and positioning holes 33. A number of the containing holes 32 corresponds to a number of the splines 211, and a number of the positioning holes 33 corresponds to a number of the positioning rib 212. Thus, the splines 211 and the positioning rib 212 are respectively engaged with the containing holes 32 and the positioning holes 33. Of course, the sprocket 30 could also be disposed with the outer shell 20 of the hub.

In addition, with a purpose of solving a problem that the splines 211 will be worn off because of the driving collision between the splines 211 of the aluminum outer shell 20 and the sprocket 30, the present invention further includes a protecting member which is disposed on the outer shell 20 of the hub.

Preferably, the protecting member is made of hard metal, "steel", which is different from the outer shell made of aluminum (or composite materials). As for structures of the protecting member, there are four embodiments of the protecting member described as the followings.

The first embodiment is shown in FIGS. 1 and 2. The steel protecting member comprises a ring-shaped body 41 and plural abutting members 42 extending from the ring-shaped body 41. The abutting members 42, shaped to be plates respectively, are annularly arranged and spaced-apart. Each of the abutting members 42 has an arc-shaped inner surface 421 with a radian corresponding to the radius of curvature of the outer peripheral surface 21. A number of the abutting members 42 is equal to the number of the splines 211, and a diameter of a circle defined by free ends of the abutting members 42 is smaller than a diameter of a circle defined by the other ends of the abutting members 42 where they are connected with the ring-shaped body 41. Also, the diameter of a circle defined by free ends of the abutting members 42 is smaller than a diameter of the outer shell 20 (Or a circular space defined by the abutting members 42 can also has the same diameter at both of the free ends and the other ends). In other words, the abutting members 42 define a cone which tapers from the other ends to the free ends. Thus, during a process of being assembled onto the outer shell 20 of the hub, the diameter of the free ends of the abutting members 42 would be expended. When the ring-shaped body 41 of the protecting member is pushed to abut the flange 22, the abutting members 42 will be pressed tightly to abut against the outer shell 20 of the hub by elastic characteristic of the abutting members 42. As a result, lateral edges of the abutting members 42 respectively and tightly abut against the splines 211.

Figure 4:
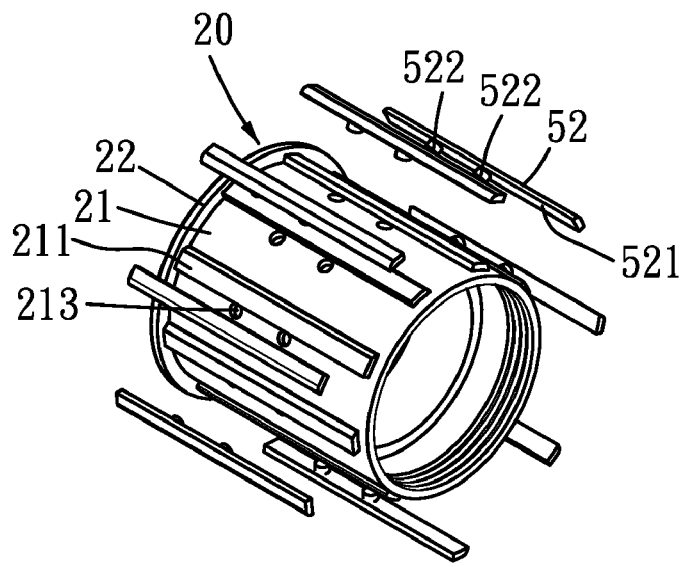
FIG. 4 is a decomposition drawing of a protection structure for outer shell of a hub in accordance with a second embodiment of the present invention.

A second embodiment is shown in FIG. 4, the protecting member made of steel is composed of the abutting members 52, and the number of protecting members 52 is the same as the splines 211. Each abutting members 52 has one lateral side abutting against each vertical surface of the splines 211, and the other lateral surfaces, shaped in arc, of the abutting members 52 are respectively opposite to the vertical surfaces. Therefore, each of the abutting members 52 has an arc-shaped inner surface 521 conforming to the outer peripheral surface 21 of the outer shell 20. Two semi-circular protrusions 522 spaced apart are formed on the arc-shaped inner surface 521. Surely, a number of the semi-circular protrusions 522 can be varied according to various requirements. The more protrusions 522, the more stable an engagement will be. However, at least one semi-circular protrusion is required. The outer peripheral surface 21 of the outer shell 20 is formed with concaves 213, and a number of the concaves 213 is the same as the number of the semi-circular protrusions 522. The concaves 213 are located on a surface where the outer peripheral surface 21 is adjacent to one of lateral sides of the splines 211. Through the engagement between the semi-circular protrusions 522 and the concaves 213, the abutting members 52 can be detachably mounted on the outer shell 20 to protect the splines 211.

Figure 5:
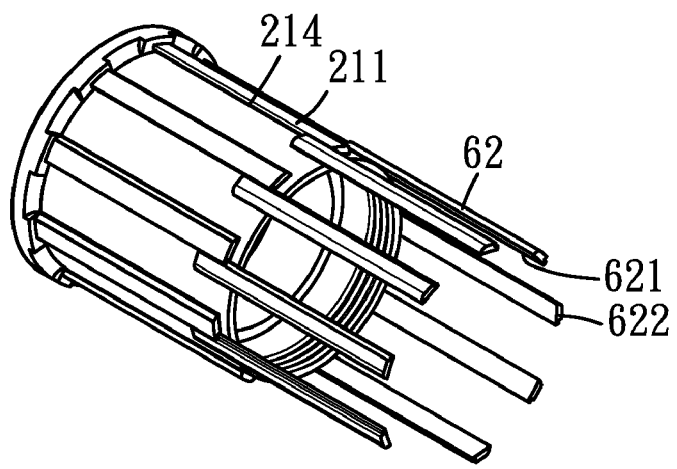
FIG. 5 is a perspective drawing of a protection structure for outer shell of a hub in accordance with a third embodiment of the present invention.

Apart from the second embodiment, a third embodiment is shown in FIG. 5, wherein the protecting member made of steel is the abutting members 62 respectively shaped to be plates. The number of the protecting members is the same as the splines 211. Each of the abutting members 62 has an arc-shaped inner surface 621 conforming to the outer peripheral surface 21 of the outer shell 20. Each of the abutting members 62 has a lateral side corresponding to one of the splines 211. The lateral sides of the abutting members 62 are respectively formed with guiding edges 622 to be respectively engaged with guiding grooves 214 of the splines 211, so that the abutting members 62 can be detachably mounted on the outer shell 20 to protect the splines 211 by pushing the guiding edge 622 into the guiding groove 214.

Figure 6:
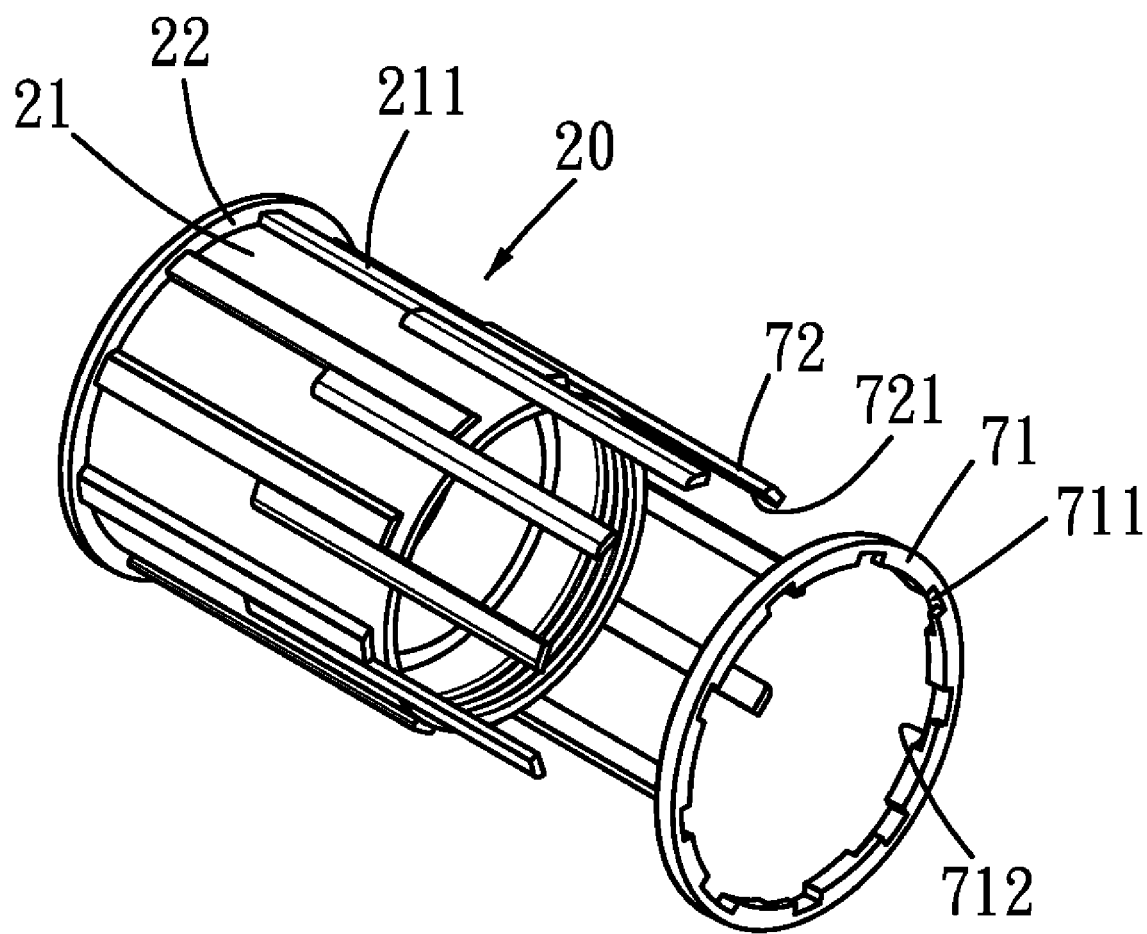
FIG. 6 is a decomposition drawing of a protection structure for outer shell of a hub in accordance with a fourth embodiment of the present invention.

Furthermore, a fourth embodiment is shown in FIG. 6, wherein the protecting structure made of steel comprises a ring-shaped body 71 and abutting members 72. The number of the abutting members 72 is same as the splines 211. A plurality of slots 711 corresponding to the splines 211 are formed around an inner surface of the ring-shaped body 71. The slots 711 axially penetrate through the ring-shaped body 71. A plurality of grooves 712 are formed beside the slots 71 in a non-penetrating manner, and positions of the slots 711 respectively correspond to positions of the splines 211. Also, the number of the slots 711 respectively corresponds to positions of the splines 211. Each of the abutting members 72 has an arc-shaped inner surface 721 conforming to the outer peripheral surface 21 of the outer shell 20. When the ring-shaped body 71 is inserted onto the outer shell 20, the abutting members 72 can be inserted in the grooves 712 and the splines 211 can be inserted through the slots 711 of the ring-shaped body 71.

With mounting on the outer shell of the hub detachably, the present invention achieves the following advantages:

Firstly, with mounting the protecting members are onto the outer shell of the hub detachably, the abutting members 42, 52, 62 and 72 made of steel can be respectively engaged with the containing holes 32 of the sprocket 30, so that, during rotation, the sprocket 30 drives and collides with the abutting members 42, 52, 62 and 72 made of steel. Thus, a goal of protecting the splines 211 made of aluminum from being damaged is achieved.

Secondly, after the outer shell 20 is driven and collided by the sprocket 30 made of steel for a long period of time, the only component which is probably damaged is the protecting members, and a cost of the protecting member made of steel is lower than a cost of the protecting member made of the aluminum. In comparison to the conventional art that the outer shell of the hub will be worn off and replaced together with the hub at regular intervals, the protecting member is detachably mounted to the hub so that the protecting member can be replaced conveniently and the hub 20 can still be used.

Thirdly, the abutting members 42, 52, 62, 72 made of steel are disposed and cooperating with the splines 211 of the outer shell 21 made of aluminum to form a width which equals a width of the containing holes 32 of the sprocket 30. In general, the amount of aluminum material used for the splines of the outer shell of the hub is only two-third or half of the amount used for the conventional structure. Additionally, the protection structure made of steel not only protects the outer shell of the hub but also saves the aluminum consumption.

While we have shown and described various embodiments in accordance with the present invention, it should be clear to those skilled in the art that further embodiments may be made without departing from the scope of the present invention.

What is claimed is:

1. A protection structure for an outer shell of a hub, comprising a hub and an outer shell mounted at one end of the hub, the outer shell being formed at one end proximate the hub with an enlarged flange, a plurality of splines and at least one positioning rib being annularly and spaced-apart formed on an outer peripheral surface of the outer shell, each one of the splines having at least one side disposed with a protecting member, a material of the protecting member being different from a material of the outer shell.

2. The protection structure for an outer shell of a hub as claimed in claim 1, wherein the outer shell is made of aluminum and the protecting member is made of steel, the protecting member comprises a ring-shaped body and a plurality of annularly arranged and spaced-apart abutting members, the abutting members are shaped to be plates, the abutting members extend from the ring-shaped body, the metal protecting member is detachably mounted onto the outer shell in such a manner that the ring-shaped body of the protecting member abuts against the flange of the outer shell, and the abutting members respectively abut against lateral sides of the splines.

3. The protection structure for an outer shell of a hub as claimed in claim 2, wherein a diameter of a circle defined by free ends of the abutting members is smaller than a diameter of a circle defined by the other ends of the abutting members, the diameter of a circle defined by free ends of the abutting members is smaller than a peripheral diameter of the outer shell, the other ends of the abutting members are connected with the ring-shaped body.

4. The protection structure for an outer shell of a hub as claimed in claim 1, wherein the outer shell is made of aluminum and the protecting member is made of steel, the steel protecting member is composed of abutting members, the abutting members are shaped to be plates respectively, the number of the abutting members is the same as the splines, the abutting members are respectively formed protruding members, the protruding members are used for engaging the abutting members with an outer surface of the outer shell so that the abutting members are mounted to the outer surface of the outer shell.

5. The protection structure for outer shell of a hub as claimed in claim 1, wherein the outer shell is made of aluminum and the protecting member is made of steel, the steel protecting member is composed of abutting members, the abutting members are shaped to be plates respectively, the number of the abutting members is the same as the splines, each of the abutting members has a guiding edge to be engaged with a guiding groove of the splines respectively, so that the abutting members can be detachably mounted on the outer shell to protect the splines by pushing the guiding edge into the guiding groove along the guiding groove.

6. The protection structure for outer shell of a hub as claimed in claim 1, wherein the outer shell is made of aluminum and the protecting member is made of steel, the steel protecting member comprises a ring-shaped body and abutting members, a number of the abutting members is the same as the splines, a plurality of slots are formed around an inner surface of the ring-shaped body, the slots penetrate through the ring-shaped body, a plurality of grooves are formed in a non-penetrating manner beside the slots, and positions and a number of the slots correspond to positions and a number of the splines, when the ring-shaped body is inserted onto the outer shell, the abutting members can be inserted in the grooves and the splines can be inserted through the slots of the ring-shaped body.

* * * * *